(12) United States Patent
Inukai et al.

(10) Patent No.: US 7,615,181 B2
(45) Date of Patent: Nov. 10, 2009

(54) RUBBER INJECTION MOLDING DEVICE AND RUBBER PRODUCT MANUFACTURING METHOD

(75) Inventors: Yukio Inukai, Komaki (JP); Shigeki Kato, Komaki (JP); Takahiro Aoi, Komaki (JP); Norihito Kimura, Komaki (JP); Takahiro Imai, Komaki (JP); Yuki Akatsuka, Komaki (JP); Masami Ono, Komaki (JP)

(73) Assignees: Tokai Rubber Industries, Ltd., Komaki (JP); Sanyu Industries, Ltd., Komaki (JP)

( * ) Notice: Subject to any disclaimer, the term of this patent is extended or adjusted under 35 U.S.C. 154(b) by 813 days.

(21) Appl. No.: 11/223,994

(22) Filed: Sep. 13, 2005

(65) Prior Publication Data
US 2006/0061015 A1    Mar. 23, 2006

(30) Foreign Application Priority Data
Sep. 14, 2004    (JP) .............................. 2004-267452

(51) Int. Cl.
*B29C 45/54* (2006.01)
(52) U.S. Cl. .............................. 264/328.2; 264/328.19; 425/557; 425/561
(58) Field of Classification Search ............ 264/328.19, 264/328.2; 425/585, 557, 558, 561, 562
See application file for complete search history.

(56) References Cited

U.S. PATENT DOCUMENTS

| | | | | | |
|---|---|---|---|---|---|
| 2,359,840 | A | * | 10/1944 | Goessling | 425/146 |
| 3,191,233 | A | * | 6/1965 | Linderoth, Jr. | 425/146 |
| 3,299,475 | A | * | 1/1967 | Carlson et al. | 425/586 |
| 3,516,123 | A | * | 6/1970 | Lang et al. | 425/166 |
| 4,315,726 | A | * | 2/1982 | Semerdjiev et al. | 425/560 |
| 4,334,847 | A | * | 6/1982 | Schauffele | 425/227 |
| 5,286,187 | A | * | 2/1994 | Niimi et al. | 425/205 |
| 5,698,242 | A | * | 12/1997 | Chen et al. | 425/544 |
| 5,773,042 | A | * | 6/1998 | Amano et al. | 425/207 |
| 6,056,537 | A |   | 5/2000 | Steinl | |
| 6,403,010 | B1 | * | 6/2002 | Ganz et al. | 264/328.1 |
| 7,413,696 | B2 | * | 8/2008 | Malig et al. | 264/328.4 |

FOREIGN PATENT DOCUMENTS

| | | |
|---|---|---|
| EP | 0 287 001 A2 | 10/1988 |
| JP | A-10-235700 | 9/1998 |

(Continued)

*Primary Examiner*—Jill L Heitbrink
(74) *Attorney, Agent, or Firm*—Oliff & Berridge, PLC (57) ABSTRACT

A rubber injection molding device comprising: a mold having a molding cavity therein; an injecting machine including an injection cylinder having an injection chamber for storing a rubber therein, and an injection plunger for injecting the rubber from the injection chamber into the molding cavity by means of an advancement of the injection plunger; a feed machine having a feed cylinder with a feed aperture formed at a tip end thereof and connected with the injection chamber through a feed duct, and being adapted to feed into the injection chamber, through the feed duct the rubber in a mixed state, and a pushing assembly which pushes into the injection chamber the rubber that remains within the feed duct after a feed operation of the rubber by the feed machine. A manufacturing method of a rubber product by using the molding device is also disclosed.

11 Claims, 9 Drawing Sheets

FOREIGN PATENT DOCUMENTS

| | | |
|---|---|---|
| JP | A-11-156902 | 6/1999 |
| JP | B2 3174346 | 3/2001 |
| JP | B 3174346 | 3/2001 |
| JP | A 2003-011189 | 1/2003 |
| JP | A 2003-11189 | 1/2003 |
| WO | 03/039837 * | 5/2003 |

* cited by examiner

PRIOR ART

FIG.9A

PRIOR ART

FIG.9B

PRIOR ART

RUBBER INJECTION MOLDING DEVICE AND RUBBER PRODUCT MANUFACTURING METHOD

INCORPORATED BY REFERENCE

The disclosure of Japanese Patent Application No. 2004-267452 filed on Sep. 14, 2004 including the specification, drawings and abstract is incorporated herein by reference in its entirety.

BACKGROUND OF THE INVENTION

1. Field of the Invention

The present invention relates to rubber injection molding devices and rubber product manufacturing methods using injection molding.

2. Description of the Related Art

Figure 8:
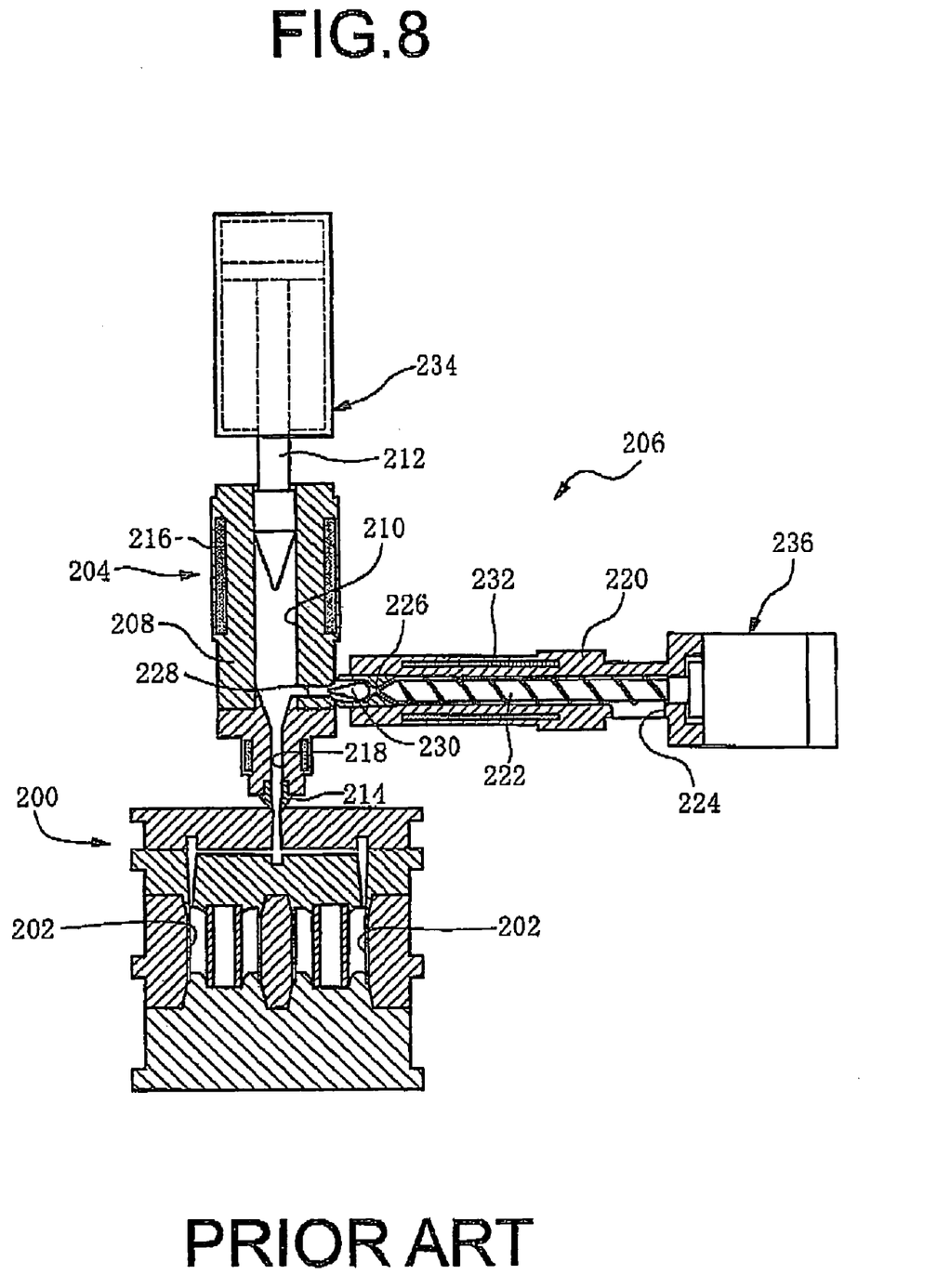
FIG. 8 is an elevational view in partially vertical cross section of a conventional rubber injection molding device.

Conventionally, the injection molding method has been used broadly as a rubber product molding method. FIG. 8 shows an example of that which has been used conventionally as a rubber injection molding device. In this figure, 200 denotes an injection mold that has a molding cavity 202. 204 denotes an injecting machine, and 206 denotes a feed machine. The injecting machine 204 has an injection chamber 210 in an injection cylinder 208, where the rubber, which is charged to a set charge amount, in this injection chamber 210 and is injected in a single stroke into the molding cavity 202 of the mold 200 from a nozzle 214 at the tip of the injection cylinder 208 by the motion in the downward direction (in the figure) of an injection plunger 212.

The injection cylinder 208 is equipped with heating apparatus 216 to heat the rubber within the injection chamber 210. Moreover, in the injection cylinder 208, a straight injection duct 218 is formed from the injection chamber 210 to the nozzle 214.

On the other hand, the feed machine 206 has a feed cylinder 220 and a screw 222, equipped therein, where rubber, supplied from a supply aperture 224, is mixed by the rotation of the screw 222, and after enhancing a molten state, the rubber is fed into the injection chamber 210 from a feed aperture 226 at the tip of the feed cylinder 220 through a feed duct 228 that connects together the feed aperture 226 and the injection chamber 210 of the injection cylinder 208.

The injection plunger 212 moves backwards (in the upwards direction in the figure) due to the pressure as the rubber is fed, or in other words, charged, into the injection chamber 210. When the amount of rubber charged into this injection chamber 210 reaches set charge amount that is appropriate for a single-stroke injection, the feeding of the rubber by the feed machine 206 is stopped. In other words, the injection chamber 210 and the injection plunger 212 have the function of measuring the rubber that is charged therein.

The heating apparatus 232 is provided for heating the rubber within the cylinder in the feed cylinder 220 in the feed machine 206 as well. A one-way valve (a reverse flow prevention valve) 230 for preventing the reverse flow of rubber within the injection chamber 210 into the feed cylinder 220 is equipped in the feed duct 228, described above, that connects between the feed machine 206 and the injecting machine 204. In FIG. 8, 234 denotes a drive device for the injection plunger 212, and 236 denotes a drive device for the screw 222 in the feed machine 206.

Figure 9A:
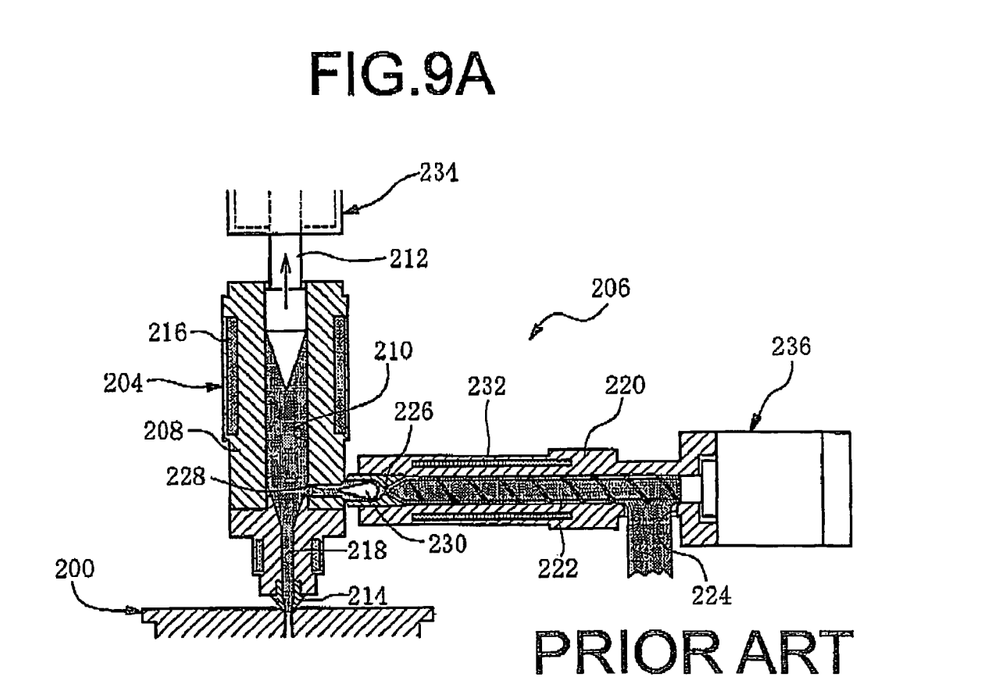
FIGS. 9A and 9B are views illustrating operation states of the conventional rubber injection molding device of FIG. 8.

FIGS. 9A and 9B show the operation of the rubber injection molding device. As illustrated, the rubber injection molding device operates such that feeding of the rubber from the feed machine 206 charges the rubber into the injection chamber 210 of the injection cylinder 208, where, at the same time, the injection plunger 212 moves backwards (in the upwards direction in FIG. 9A). When the injection plunger 212 arrives at the back limit, established in advance, the feeding of the rubber from the feed machine 206 is stopped. The back limit of the injection plunger 212 is set in advance to a position wherein the amount of rubber charged into the injection chamber 210 is a set charge amount appropriate for a single-stroke injection.

Figure 9B:
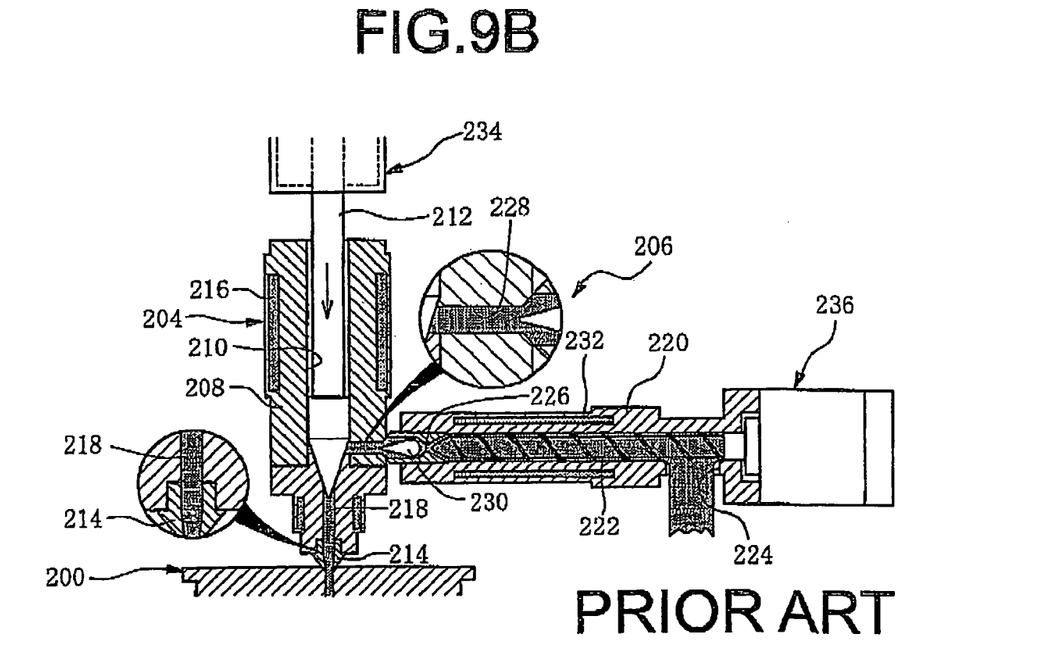

When the set amount of rubber has been charged into the injection chamber 210 in this way, then, as shown in FIG. 9B, the injection plunger 212 moves forward (in the downward direction in the figure), causing the rubber that is charged into the injection chamber 210 to pass through the straight injection duct 218 to be injected, in a single stroke, from the nozzle 214 into the molding cavity 202 of the mold 200. There is a certain amount of rubber remaining in the straight injection duct 218 when the advancement of the injection plunger 212 has finished injecting the rubber from within the injection chamber 210 into the molding cavity 202. This remaining rubber will be injected into the molding cavity 202 in the next injection cycle.

The rubber injected into the molding cavity 202 is cured for a specific amount of time within the mold 200, which has been brought to the vulcanization temperature in advance, after which the rubber is removed from the mold 200. In cure molding of rubber products using this rubber injection mold device, the rubber is injected into the molding cavity 202 at a temperature that is less than the temperature of the mold 200. The injected rubber is heated to the temperature of the mold 200 through being heated by the mold 200, after which vulcanization is performed through maintaining the temperature of the mold at the vulcanization set temperature for a specific amount of time.

For example, conventionally if the rubber temperature within the injection chamber is about 90° C., the temperature of the rubber in the stage wherein it is passing through the nozzle 214 is about 110° C., and the temperature of the rubber at the point in time wherein it has been injected into the molding cavity 202 is 130° C., the rubber that has been injected into the molding cavity 202 is cured through heating for about six minutes with the vulcanization set temperature for the mold set at 170° C.

Although the vulcanization starts gradually for the rubber that has been injected into the molding cavity 202, due to the heating of the mold, when the set temperature of the mold is increased in order to shorten the vulcanization time, there will be over vulcanization near the surface of the product before the temperature rises in the center of the product, and thus in order to cure the produce uniformly five to six minutes of time has been required regardless. (Note that if the type of rubber product is changed, then, of course, the vulcanization temperature, the vulcanization conditions, the time to ramp the rubber up to the vulcanization temperature, and the like, will, of course, be different.) As described above, a certain amount of time is required to heat all of the rubber that has been injected into the molding cavity 202 up to the vulcanization temperature in order to perform vulcanization uniformly when cure molding a rubber product and this [time required for ramping up] is included in the time required for vulcanization.

Conventionally, to make the vulcanization time short in injection molding of rubber products using rubber injection molding devices has been a major issue. The longer the vulcanization time, the less the manufacturing efficiency, which not only requires a greater number of molds, but also increases the amount of space occupied by the vulcanization equipment commensurately.

In order to reduce the vulcanization time when performing cure molding of rubber products using a rubber injection molding device, it is necessary to increase the temperature of the rubber injected into the molding cavity 202. As a means to do so, one can consider increasing at least the set temperature for the rubber within the injection chamber 210.

However, in conventional rubber injection molding devices, when, as shown in FIG. 9B, the rubber within the injection chamber 210 is injected by the forward motion of the injection plunger 212, there will be residual rubber within the straight injection duct 218 and within the feed duct 228, which connects between the feed aperture 226 at the tip of the feed cylinder 220 and the injection chamber 210, and thus if the set temperature for the injection chamber 210 is increased too far, then scorching (burning of the rubber) will result. Because scorched rubber has an adverse effect on product quality, the problem cannot be solved by simply increasing the set temperature.

When it comes to the residual rubber in the injection duct 218, not only can the injection duct 218 (formed in the nozzle 214) be shortened by having the tip part of the injection chamber 210 be the same shape as the tip part of the injection plunger 212 as shown in, for example, JP-A-2003-11189, JP-B-3174346, and EP0 287 001, but also this residual rubber can be discharged together with the runner on the mold side by having a shape that widens towards the bottom.

However, in these conventional devices, no consideration has been given to the rubber that remains in the feed duct 228. Even if the temperature setting for the heating apparatus 232 of the feed machine is increased in order to increase the temperature of the rubber that is supplied to the injection chamber 210, the temperature of the rubber that remains within the feed duct 228 will decline until the start of the next feed cycle by the action of the injection plunger 212, which will cause variability in the temperature distribution within the injection chamber 210. If, in order to prevent this reduction in temperature, heating apparatus are provided around the periphery of the feed duct, then scorching will become a problem. Conventionally, these problems have not been addressed, nor have any means of resolution thereof been disclosed or proposed.

SUMMARY OF THE INVENTION

It is therefore one object of this invention to provide a rubber injection molding device, and a method of manufacturing a rubber product using injection molding, wherein it is possible to reduce the vulcanization time through increasing the temperature of the rubber that is injected into the mold without producing residual rubber within the feed duct.

The above and/or optional objects of this invention may be attained according to at least one of the following modes of the invention. The following modes and/or elements employed in each mode of the invention may be adopted at any possible optional combinations. It is to be understood that the principle of the invention is not limited to these modes of the invention and combinations of the technical features, but may otherwise be recognized based on the teachings of the present invention disclosed in the entire specification and drawings or that may be recognized by those skilled in the art in the light of the present disclosure in its entirety.

A first mode of the invention provides a rubber injection molding device comprising: (A) a mold having a molding cavity therein; (B) an injecting machine including an injection cylinder having an injection chamber for storing a rubber therein, and an injection plunger for injecting the rubber from the injection chamber into the molding cavity by means of an advancement of the injection plunger; (C) a feed machine having a feed cylinder with a feed aperture formed at a tip end thereof and connected with the injection chamber through a feed duct, and being adapted to feed into the injection chamber, through the feed duct the rubber in a mixed state, and (D) a pushing assembly which pushes into the injection chamber the rubber that remains within the feed duct after a feed operation of the rubber by the feed machine.

A second mode of the invention provides a rubber injection molding device according to the aforementioned first mode, further comprising: a reverse flow prevention member for retaining the rubber within the the injection chamber and preventing a reverse flow of the rubber into the feed duet from the injection chamber, after the rubber within the feed duct has been pushed into the injection chamber.

A third mode of the invention provides a rubber injection molding device according to the aforementioned first or second mode, wherein the pushing assembly includes a moveable piston that has essentially a same cross-sectional shape as the feed duct, where rubber within the feed duct is pushed into the injection chamber through the piston being moved forward along the feed duct by a driving device.

A fourth mode of the invention provides a rubber injection molding device according to the aforementioned third mode, wherein the piston is in the shape of a rod.

A fifth mode of the invention provides a rubber injection molding device according to the aforementioned third or fourth mode, wherein the feed duct is equipped in a form of a straight line, and a movement passage is formed in a form of a straight line along with the feed duct for permitting the piston to move forward within the feed duct or to draw backwards within the feed duct.

A sixth mode of the invention provides a rubber injection molding deice according to any one of the aforementioned first through fifth modes, further comprising a heating apparatus for heating provided at an outer peripheral portion of the feed duct so as to heat the rubber that is fed from the feed machine.

A seventh mode of the invention provides a rubber injection molding device according to any one of the aforementioned first through seventh modes, wherein the injection plunger that moves forwards and backwards according to charging of the rubber into the injection chamber by a feed of rubber from the feed machine comprises detection device for detecting withdrawal to a set withdrawal limit and a control unit for stopping the feed of the rubber by the feed machine based on detection by the detection device, the set withdrawal limit being set so that an amount of rubber charged into the injection chamber added to an amount of remaining rubber pushed in from the feed duct will be the set amount for a single charge.

An eighth mode of the invention provides a rubber injection molding device according to any one of the aforementioned first through eighth modes, wherein the injection chamber has a tapered shape at a tip end part extending to a tip end nozzle of the injection cylinder, and the injection plunger has, at a tip end thereof, a tapered shape that is a same shape as the tip end part of the injection chamber so that the tip end pat of the injection plunger mates with the tip end part of the injection chamber to fill the tip end part of the injection chamber at a forward limit thereof.

A ninth mode of the invention provides a manufacturing method of a rubber product by using an injection molding device comprising a mold having a molding cavity therein; an injecting machine including an injection cylinder having an injection chamber for storing a rubber therein, and an injection plunger for injecting the rubber from the injection chamber into the molding cavity by means of an advancement of the injection plunger; a feed machine having a feed cylinder with a feed aperture formed at a tip end thereof and connected with the injection chamber through a feed duct, and being adapted to feed into the injection chamber, through the feed duct the rubber in a mixed state; and a pushing assembly which pushes into the injection chamber the rubber that remains within the feed duct after a feed operation of the rubber by the feed machine, the method comprising the steps of: pushing the rubber that remains within the feed duct, into the injection chamber by the pushing assembly, after the feed action of the rubber by the feed machine; and, then injecting the rubber stored in the injection chamber into the molding cavity by means of a forward motion of the injection plunger so that the rubber is vulcanization molded within the molding cavity.

The invention as described above is provided with pushing assembly for pushing into the injection chamber the rubber remaining in the feed duct after the motion of feeding the rubber from the feed machine. With this arrangement, the problems with instability of the rubber injected into the molding cavity due to variability in the rubber temperature within the injection chamber due to remaining rubber, and the problems with supplying scorched rubber, are solved by the prevention of the occurrence of remaining rubber within the feed duct after the injection into the molding cavity within the mold through the injection of rubber into the injection cavity by the forward motion of the injection plunger, thereby enabling the temperature of the rubber at the state wherein it is injected into the molding cavity to higher than has been conventional.

With this arrangement, it is possible to reduce as much as possible the time for the rubber that is injected into the molding cavity to reach the vulcanization temperature, enabling the time required for vulcanization to be reduced greatly from that which has been conventional.

Accordingly, it is not only possible to greatly improve the manufacturing efficiency for rubber products through the reduction in vulcanization time that is achieved, but also to reduce the number of molds that are required, producing also the effect of reducing the space required for the vulcanization equipment accordingly.

In the present invention, the aforementioned pushing assembly can work as a reverse flow prevention member for retaining the rubber within the injection chamber after the rubber within the feed duct has been pushed into the injection chamber, and for preventing the reverse flow of the rubber from the injection chamber into the feed duct side (Second Mode). This enables the elimination of the reverse flow prevention valve 230 in the conventional rubber injection molding device shown in FIG. 8.

In the conventional rubber injection molding device, the presence of the reverse flow prevention valve 230 in the feed duct was one factor interfering with the elimination of the remaining rubber within the feed duct 228, but in the present invention, the pushing assembly itself, which pushes the rubber within the feed duct into the injection chamber, acts as the reverse flow prevention valve, so that the reverse flow prevention valve 230, which has been required conventionally, is unnecessary, enabling the rubber within the feed duct 228 to be pushed easily into the injection chamber.

When this type of reverse flow prevention valve 230 is provided, problems occur wherein there are occurrences of residual rubber within the reverse flow prevention valve 230 as well, and, in this regard, the present invention allowing the elimination of this type of reverse flow prevention valve 230 enables, at the same time, the solution of the problem with the residual rubber remaining within the reverse flow prevention valve 230.

In the present invention, the provision of the pushing assembly as a moveable piston having a cross-sectional shape essentially the same as the feed duct, and the moving of the piston along the feed duct by a driving device, makes it possible to push the rubber that is in the feed duct into the injection chamber (Third Mode). Doing this allows the pushing assembly to be structured easily, and enables the rubber within the feed duct to be pushed into the injection chamber efficiently. Here the moveable piston may be formed in the shape of a rod (Fourth Mode).

In the present invention, not only is the aforementioned feed duct equipped linearly, but also the movement path for advancing or withdrawing the piston within the feed duct may be made to be on a straight line with the feed duct (Fifth Mode).

Next, in the sixth mode, heating apparatus are provided, in the outer peripheral part of the feed duct, for heating, in a part of the feed duct, the rubber that is fed from the feed machine. Conventionally, there have been differences in temperatures between the rubber that is fed first from the feed machine (the "first-feed rubber"), from the middle-, and last-feed rubber, where this has been a cause of variability in the rubber temperature of the rubber that is injected into the molding cavity, which has lead to problems with the influence thereof on product characteristics.

With the arrangement according to the sixth mode, the temperature of the first-feed rubber can be increased, making it possible to reduce the variability in the temperature of the rubber that is injected into the molding cavity, enabling improved product quality.

The heating apparatus may be set to a temperature setting that is a higher temperature than that of the heating apparatus provided in the feed machine. When it comes to the rubber temperature of the middle-feed rubber and the last-feed rubber from the feed machine, the temperatures will be increased through self-generated heat due to compression and shear forces due to the rotation of the screw, in addition to the heating by the heating apparatus equipped in the feed machine. However, the action is of necessity intermittent action, given the injection action and because there will be little influence of this self-generated heat, in any case the rubber temperature will be low for the first-feed rubber.

Since the temperature of the temperature setting for the heating apparatus that heats the rubber in the feed duct to a temperature that is higher than that of the heating apparatus equipped in the feed machine, the rubber temperature of the first-feed rubber can effectively be increased.

It should be appreciated that setting the temperature of heating by these heating apparatus to a rubber temperature greater than that of the middle- and last-feed rubber, taking self-generated heat into account, enables the charging into the injection chamber of rubber with a stabilized temperature, regardless of whether it is from the first, middle, or last feeds.

While conventionally there have been problems with the occurrence of scorching in the residual rubber within the feed duct due to heating by the heating apparatus over the interval between when the injection plunger moves forward and the feed machine is actuated (which may be several minutes if the vulcanization time is long) when heating apparatus are equipped in a case wherein there is residual rubber within the feed duct that does not have a pushing assembly, in the present invention there is no residual rubber in the feed duct, and thus there is no danger of this problem occurring. In other words, in the present invention, the occurrences of residual rubber within the feed duct are eliminated, making it possible to provide this type of heating apparatus.

Note that in a conventional rubber injection molding device, the position wherein the amount of rubber charged into the injection chamber is the set charge amount is determined by the withdrawal limit of the injection plunger. Furthermore, in the rubber injection molding device according to the present invention, after the feed of the rubber has been stopped from the feed machine, the pushing assembly pushes the rubber in the feed duct into the injection chamber. Consequently, as with the conventional technology, when the injection plunger is set to the withdrawal limit, the amount of rubber is the amount for a single charge. Here, in the seventh mode, the injection plunger withdrawal limit is set taking into account the amount of rubber pushed into the feed duct by the pushing assembly thereafter, and thus, given the present invention, the appropriate amount of rubber is charged into the injection chamber, regardless of the forcing into the rubber within the feed duct by the pushing assembly, enabling the amount to be the amount for a single charge.

Next, in the eight mode, not only does the injection chamber have a shape that narrows in the tip part until it reaches the nozzle at the tip end of the injection cylinder, but also the tip part of the injection plunger, corresponding thereto has a shape that narrows with the same shape as the tip part of the injection chamber. Therefore, at the forward limit, they mate together, structured so that the tip end of the injection chamber is filled with the tip end of the injection plunger, and thus, it is possible to eliminate the occurrence of residual rubber within the injection cylinder after the injection. Having the structure that is combined with the prevention of the occurrence of residual rubber within the feed duct in the first mode, this causes the rubber that is pushed from the feed machine to be completely replaced, without fail, with each injection cycle, with none remaining, making it possible to have the rubber temperature for the entire rubber injection molding device be high, allowing the rubber temperature of the injection rubber to be even higher, making it possible to reduce substantially the vulcanization time.

The ninth mode relates to method of manufacturing rubber products, where, when performing injection molding of rubber products using an injection molding device, the rubber remaining within the feed duct after the feed operation of the rubber by the feed machine is pushed into the injection chamber by a pushing assembly, and, thereafter, the forward motion of the injection plunger causes the rubber within the injection chamber to be injected into the molding cavity, and vulcanization is performed. With this method of manufacturing, the remaining rubber within the feed duct can be eliminated, making it possible to eliminate various problems caused by supplying into the injection chamber scorched rubber or rubber with non-uniform temperature. Furthermore, by eliminating the residual rubber within the feed duct, the temperature of the rubber that is supplied into the molding cavity, and the setting for the temperature of the rubber in the rubber injection molding device can be increased, thus enabling the vulcanization time to be reduced effectively and substantially.

BRIEF DESCRIPTION OF THE DRAWINGS

The forgoing and/or other objects features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Figure 1:
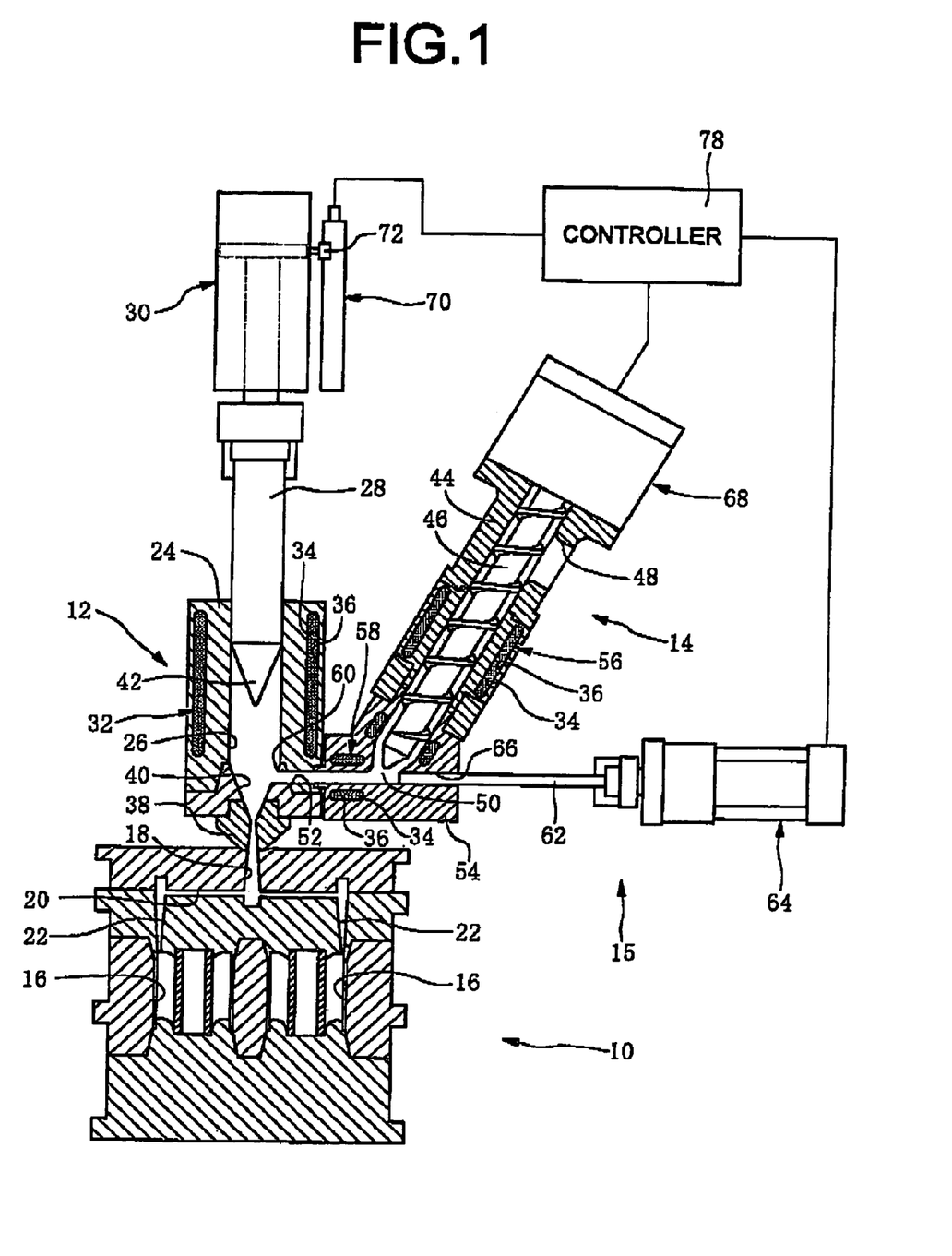
FIG. 1 is an elevational view in partially vertical cross section of a rubber injection molding device overall of construction according to a first embodiment of the invention.

FIG. 1 illustrates the overall structure of a rubber injection molding device according to a form of embodiment of the present invention. As is shown in FIG. 1, the rubber injection molding device is equipped with a pushing assembly 15 in addition to a mold 10, and injecting machine 12 and a feed machine 14.

The mold 10 has a molding cavity 16 therein, and also has a sprue 18, a runner 20, and a gate 22, connected to this molding cavity 16. 24 is an injection cylinder of the injecting machine 12. The injection cylinder 24 includes an injection chamber 26. A rubber is charged into this injection chamber 26, and then is expelled from a nozzle 38 at the tip part of the injection cylinder 24 (the bottom tip, as shown in the figure) by the forward motion of an injection plunger 28, shown as motion in the downward direction in FIG. 1, and is injected into the molding cavity 16 of the mold 10.

The injection plunger 28 is driven in the forward direction, which is the downward direction in FIG. 1, by a drive cylinder 30. The injection plunger 28 is in a free state in the withdrawal direction, where, when rubber is charged into the injection chamber 26 from the feed machine 14, the pressure thereof causes the withdrawal motion, which is in the upper direction in the figure.

A heating apparatus 32 is provided in the injection cylinder 24 for heating the rubber within the injection chamber 26. The heating apparatus 32 is structured here from a heating medium 34 and a duct 36 through which the heating medium 34 passes.

Figure 2A:
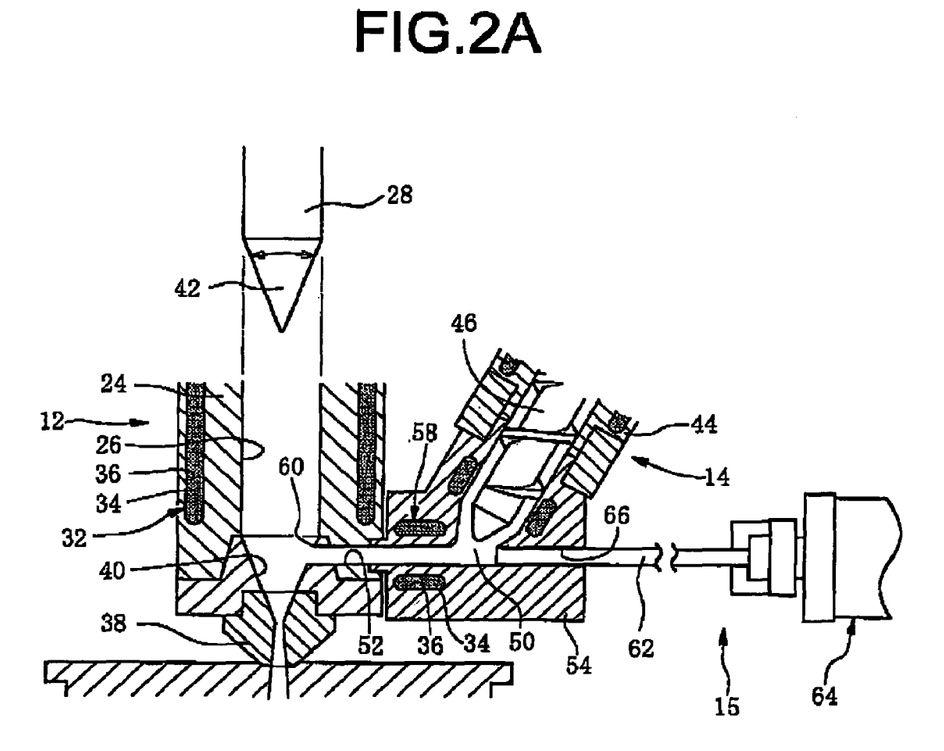
FIG. 2A is a fragmentally enlarged view of the rubber injection molding device of FIG. 1.

In the present embodiment, the injection chamber 26 is structured to include up to an injection aperture at the tip end of the nozzle 38, as also shown in FIG. 2A. The tip end part of the injection chamber 26 is a tapered part 40, which tapers towards the end as shown in FIG. 2A. A tip end part of the injection plunger 28, corresponding thereto, has a tapered part 42 with the same taper angle. The result is that when the injection plunger 28 sticks out to a front tip limit, as shown in FIG. 3, the tapered part 40 of the injection chamber 26 and the tapered part 42 of the injection plunger 28 fit together with approximately no gap, so that the tapered part 40 of the injection chamber 26 is plugged by the tapered part 42 of the injection chamber 26.

In other words, at the point in time wherein the injection plunger 28 protrudes to the forward limit, the injection chamber 26 as a whole is filled by the injection plunger 28. Consequently, in the present embodiment, when the rubber is injected by the forward motion of the injection plunger 28, the rubber within the injection chamber 26 is all expelled from the nozzle 38 and injected into the molding cavity 16 of the mold 10. In other words, there will be no occurrence of residual rubber, after injection by the forward motion of the injection plunger 28, in the injection cylinder 24.

The feed machine 14, described above, comprises a feed cylinder 44 and a screw 46, assembled within the feed cylinder 44. The rotational motion of the screw 46 kneads and mixes the rubber that is supplied from a supply aperture 48 to increase the fluidity thereof, so that, as shown in FIG. 2A, the rubber is fed into the injection chamber 26 through the feed duct 52 that is connected to the injection chamber 26 and a feed aperture 50, from the feed aperture 50 at the tip end of the feed cylinder 44.

Figure 3:
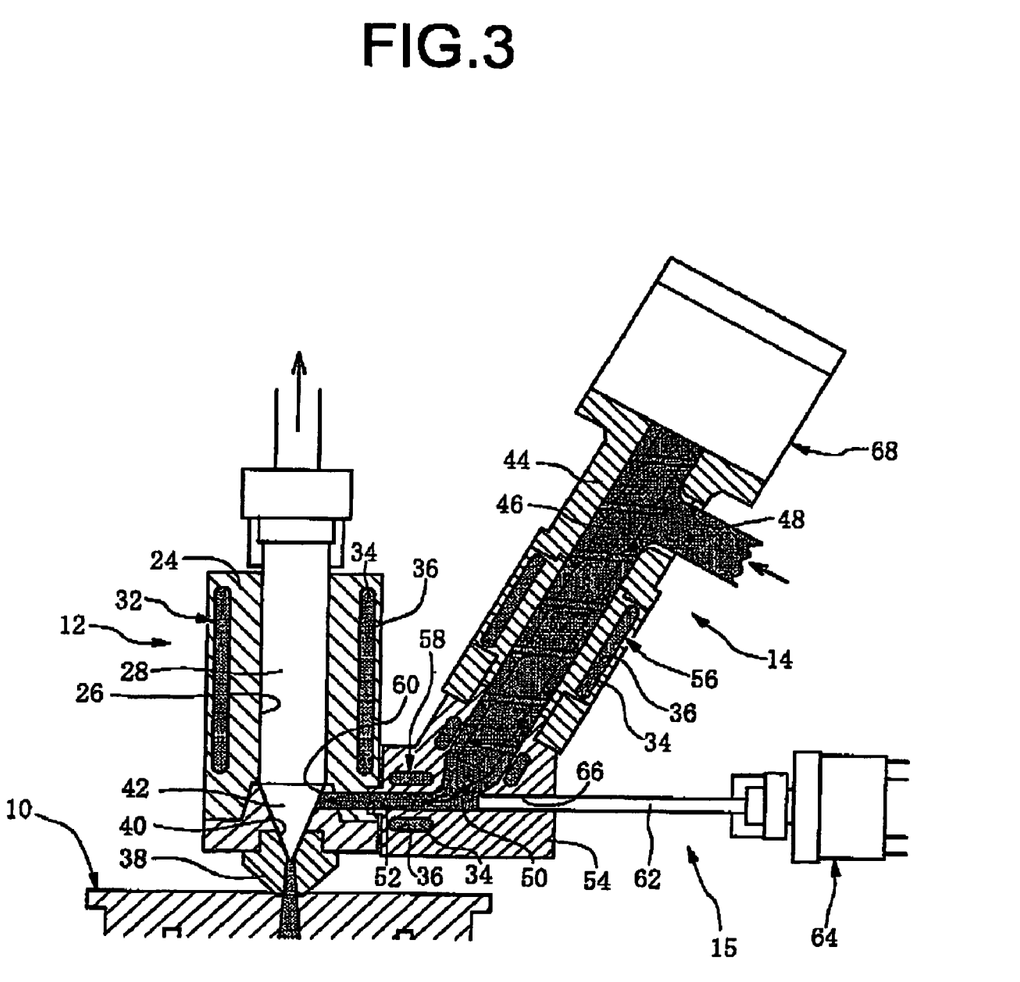
FIG. 3 is a view illustrating one operation state of the rubber injection molding device of FIG. 1.

At this time, the injection plunger 28 withdraws, in the upwards direction in FIG. 3, by the pressure accompanying the charging of the rubber into the injection chamber 26. The feed duct 52 is provided linearly in the horizontal direction in FIG. 3, where the tip thereof is open into the injection chamber 26 in the tapered part 40.

The feed cylinder 44 is equipped with a heating apparatus 56 for heating the rubber within the feed cylinder 44, when kneading, through the rotational motion of the screw 46, the rubber that has been supplied. The heating apparatus 56 is also structured from the heating medium 34 and the duct 36 through which the heating medium 34 travels.

A connecting block 54 connects the feed machine 14 and the injecting machine 12. The feed duct 52 is formed, in one part thereof, by this connecting block 54. This connecting block 54 is equipped, in the outer peripheral part of the feed duct 52, with a heating apparatus 58 for heating the rubber that is fed through the feed duct 52. The heating apparatus 58 also comprise the heating medium 34 and the duct 36 through which the heating medium 34 travels.

The heating temperature by the heating apparatus 58 is set to a temperature that is higher than the heating temperature by the heating apparatus 56 of the feed cylinder 44. The heating temperature by the heating apparatus 58 is a temperature that is higher than the temperature of the last-feed rubber that is fed from the feed machine 14. Of the rubber that is fed from the feed machine 14, the middle-feed rubber and the last-feed rubber will have temperatures that are approximately 20° C. higher than the first-feed rubber, due to the self-generated heat caused by compression and shearing, in addition to the heating by the heating apparatus 56. The heating temperature by the heating apparatus 58 is a temperature about 10° C. higher than that, and, as the result, heats the first-feed rubber with a temperature difference of nearly 30° C., heats the middle-feed rubber with a temperature difference of about 20° C., and heats the last-feed rubber with a temperature difference of about 10° C. Namely, the feed duct 52 is heated by the heating apparatus 58 to a temperature higher than a highest temperature of the rubber fed from the feed machine 14. As well known in the art, the heating apparatuses 32, 56 and 58 are energized via a suitable controller (which is not illustrated in the drawings), so that the temperature and ON/OFF operation of each of the heating apparatuses 32, 56, 58 can be suitably regulated while taking into consideration of a rubber material, a shot amount, an operation environment, and the like. Preferably, the heating apparatus 58 is separately controlled from the other heating apparatuses 56, 58 in terms of its temperature and ON/OFF operation.

The pushing assembly 15, described above, has a rod-shaped piston 62. This piston 62 is moved in the forward direction, which is the direction to the left in FIG. 3, by a drive cylinder (a driving device) 64 to push into the injection chamber 26 the rubber that is in the feed duct 52.

Note that the piston 62 closed the opening at the front tip part of the feed duct 52 at the forward travel limit thereof, or in other words, closes a connecting aperture between the feed duct 52 and the injection chamber 26. Consequently, even if injection pressure is applied to the rubber within the injection chamber 26 by the forward motion of the injection plunger 28, the rubber within the injection chamber 26 does not flow backwards into the feed duct 52. Namely, in the present embodiment, the pushing assembly 15 at the same time also forms a reverse flow prevention device (reverse flow prevention member) that prevents the reverse flow of the rubber into the feed duct 52 from the injection chamber 26.

In the connecting block 54, a movement passage 66, for the piston 62 to move forward into the feed duct 52 and to withdraw from the feed duct 52, is formed so as to be on a straight line with the feed duct 52. A driving device 68 is provided for rotating the screw 46 in the feed machine 14, and a detecting device 70 is provided to detect the withdrawal limit of the injection plunger 28 in the injecting machine 12.

Figure 2B:
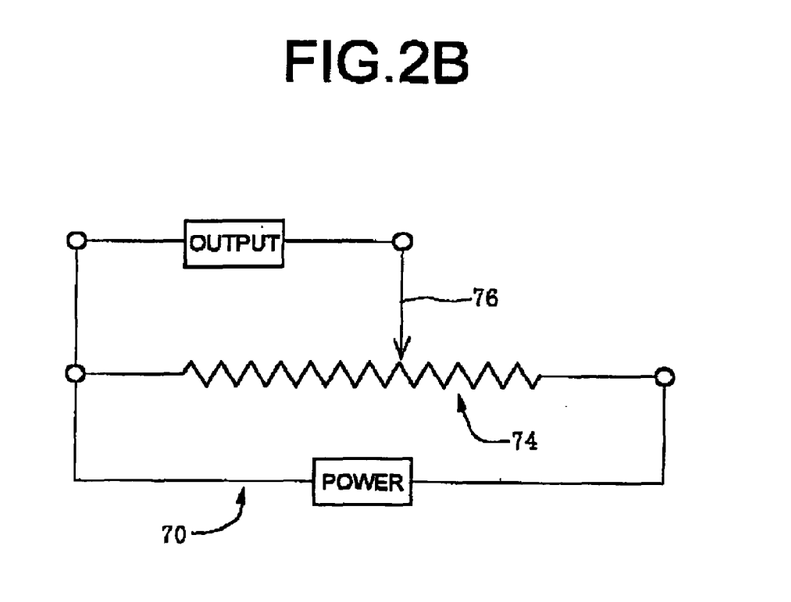
FIG. 2B is a diagram illustrating structure of a detecting device installed in the rubber injection molding device of FIG. 1.

In the present embodiment, the detecting device 70 comprises a linear potentiometer comprising a moveable part 72, which moves linearly integrated with the injection plunger 28, and a resistor 74 (see FIG. 2B). In this linear potentiometer, when the moveable part 72 moves together with the injection plunger 28, a slider 76 slides linearly on the resistor 74 as shown in FIG. 2B, so that the resistance between the slider 76 and the terminal of the resistor 74 changes proportionally to the magnitude of the dislocation. Consequently, the dislocation in the linear movement is detected by reading the voltage in the voltage divider formed by the slider 76 when a specific voltage is applied to the resistor 74.

In the present embodiment, a set withdrawal limit of the injection plunger 28 is detected by this detecting device 70. The set withdrawal limit is set in advance to the position wherein the amount of rubber that is the sum of the rubber charged into the injection chamber 26 plus the amount of rubber that is pushed in from the aforementioned feed duct 52 will be the set charge amount for a single cycle.

A controller 78 controls actions of the feed machine 14 and the pushing assembly 15 based on detector signals output from this detecting device 70. When the detecting device 70 detects that the injection plunger 28 has been withdrawn to the withdrawal limit, the detector signal is received so that the controller 78 not only stops the feed of rubber from the feed machine 14, but following this, also actuates the pushing assembly 15 to push the rubber within the feed duct 52 into the injection chamber 26 through the forward motion of the piston 62.

Next the action of the rubber injection molding device according to the present embodiment will be described in detail based on FIGS. 3-6. FIG. 3 illustrates the state wherein charging has been started after the rubber injection action from the previous cycle. In this stage, the plunger 28 is at the forward motion limit, in a state that fills the entirety of the injection chamber 26. With this state, the feed machine 14 is actuated, and the rotation of the screw 46 pushes the rubber within the feed cylinder 44 through the feed aperture 50 and the feed duct 52 into the injection chamber 26.

Figure 4:
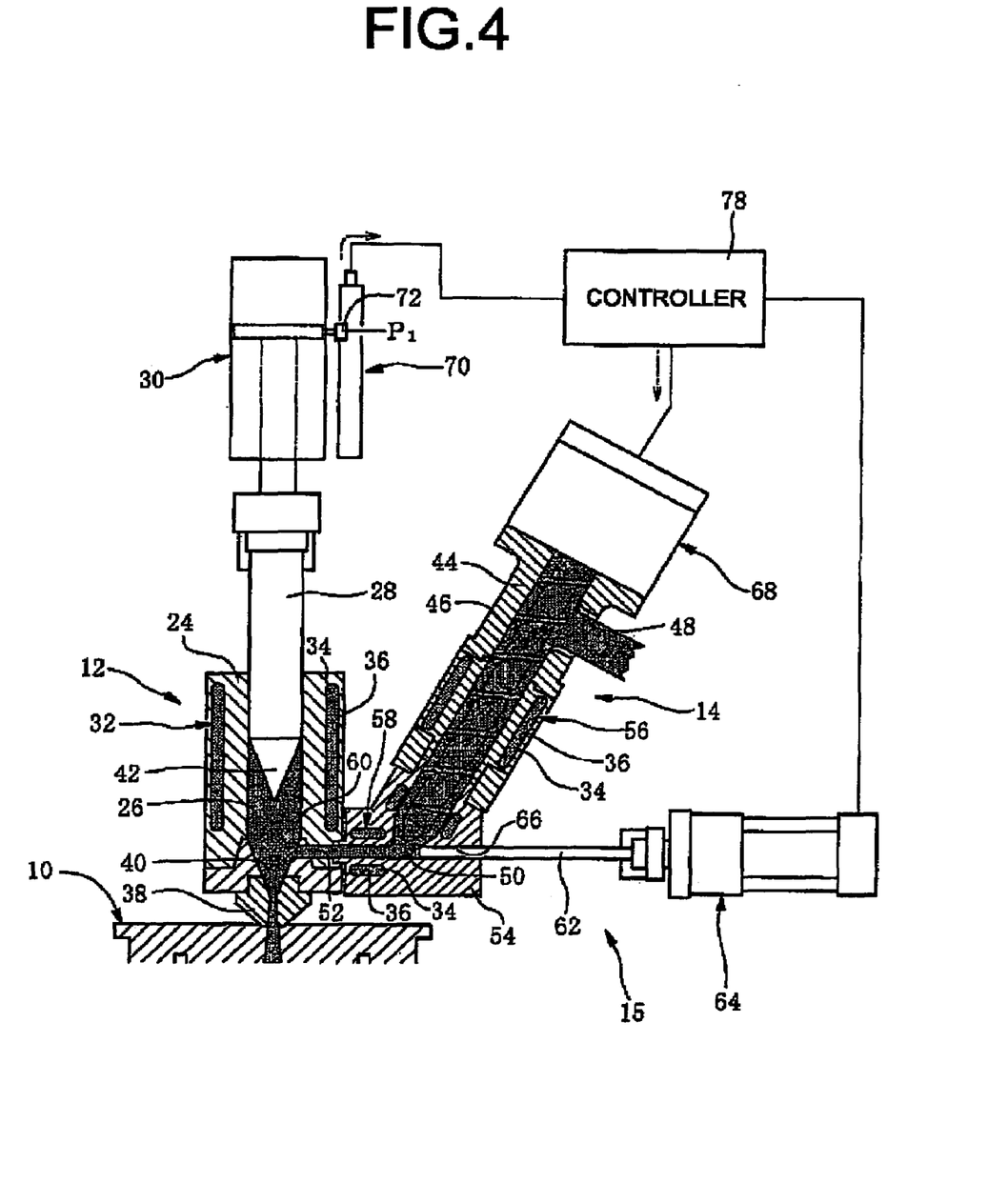
FIG. 4 is a view illustrating another operation state successive to that illustrated in FIG. 3.

The injection plunger 28, which is at the forward motion limit, is pushed by the pressure of that rubber to withdraw, in the direction shown as the upward direction in the figure, as shown in FIG. 4. Moreover, as is shown in this figure, when the injection plunger 28 arrives at the set withdrawal limit ($P_1$ in the figure), this is detected by the detecting device 70. The controller 78 stops the action of the feed machine 14 after receiving the detection signal from this detecting device 70 to stop the feed of rubber into the injection chamber 26.

Figure 5:
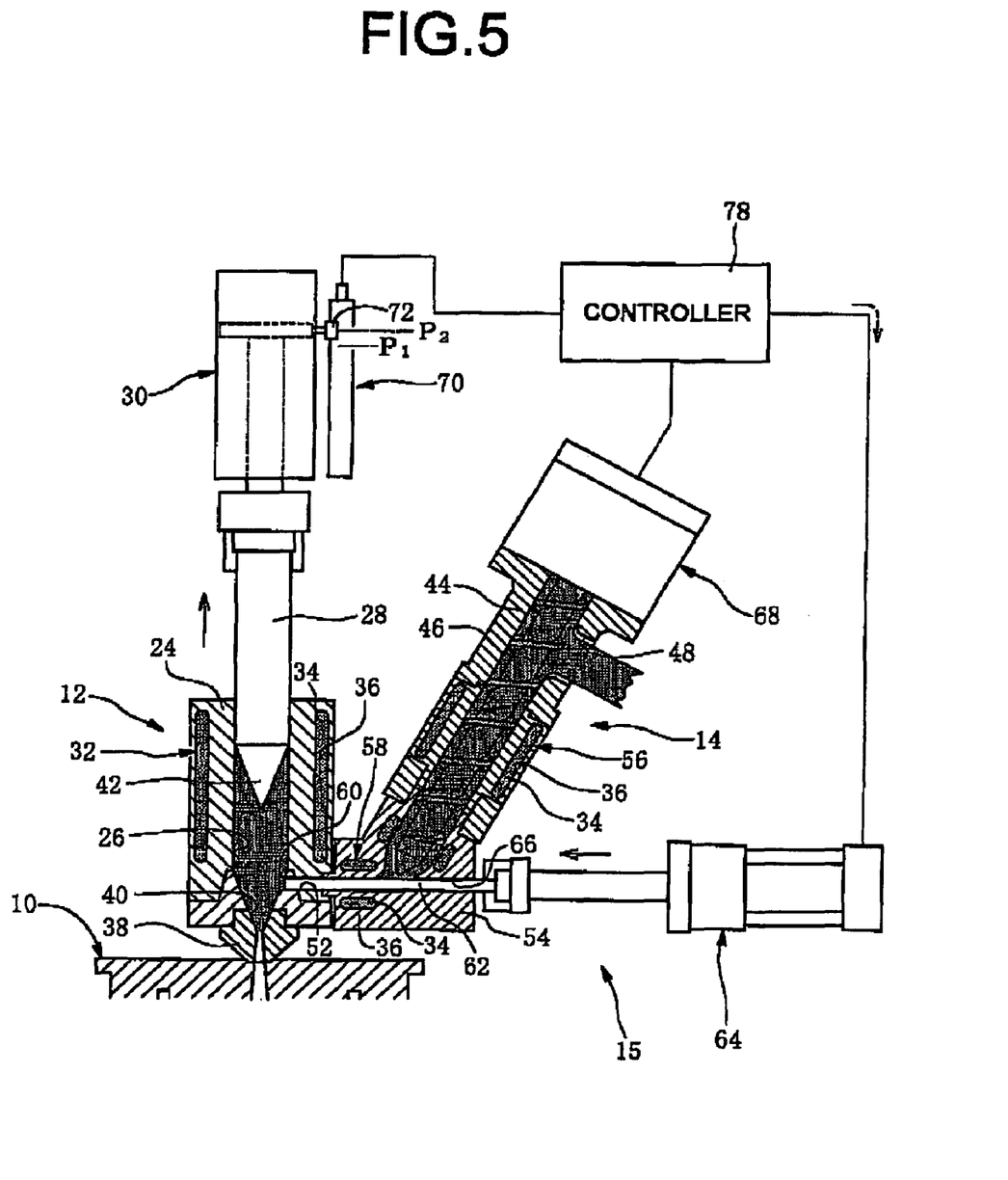
FIG. 5 is a view illustrating yet another operation state successive to that illustrated in FIG. 4.

At this stage, there is rubber remaining in the feed duct 52. Subsequently, the pushing assembly 15 is activated, and the piston 62 moves forward, in the direction shown as being to the left in the figure. With this arrangement, the forward motion of the piston 62 pushes into the injection chamber 26 the rubber that remains in the feed duct 52. At this stage, the injection plunger 28 undergoes motion that moves backwards by small strokes according to the amount of rubber that is pushed into the feed duct 52, as shown in FIG. 5, to arrive at the position $P_2$ in the figure. When a given amount of rubber has been charged into the injection chamber 26, an operation for changing the mold 10 is then executed, as shown in FIG. 5.

Figure 6:
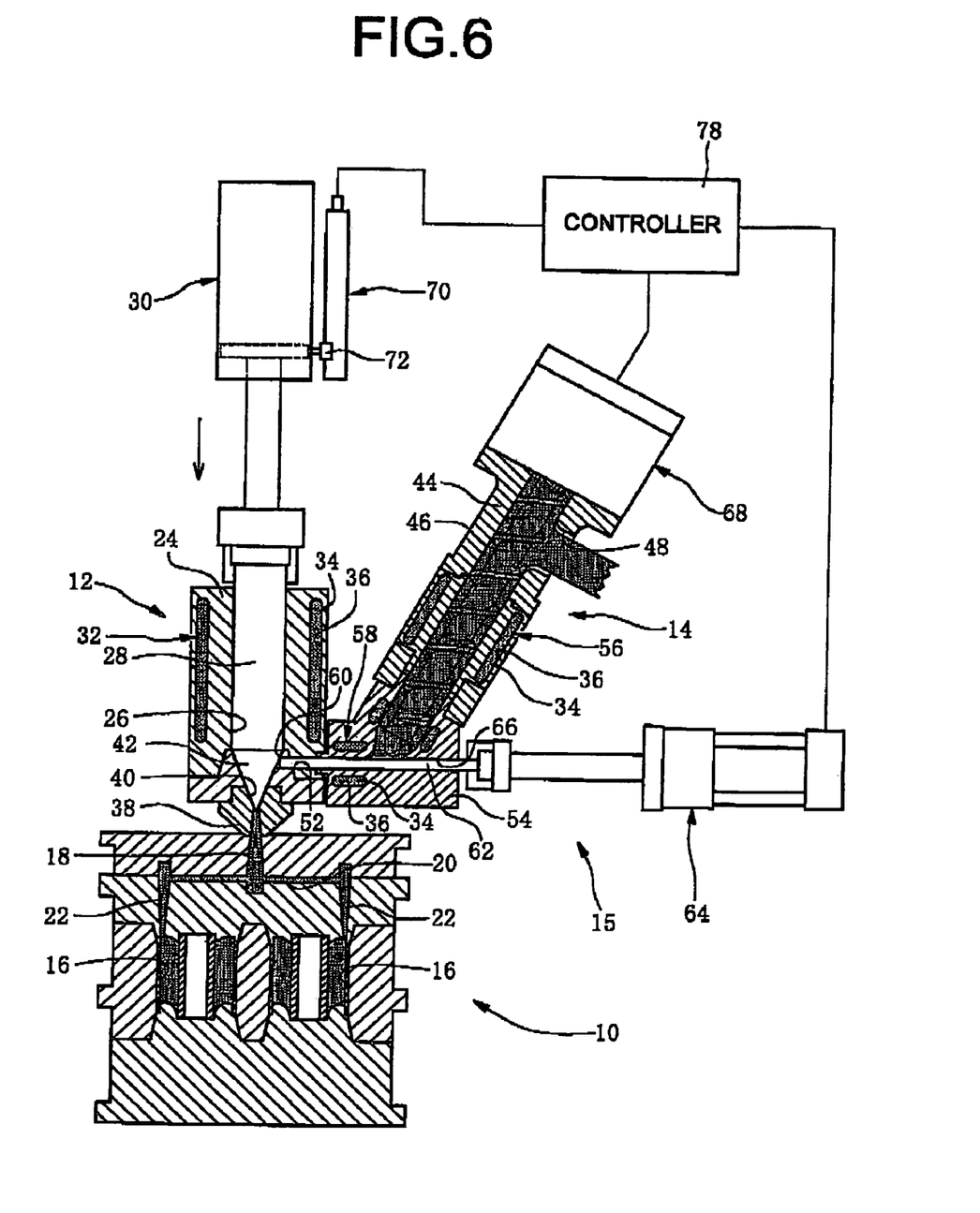
FIG. 6 is a view illustrating yet another operation state successive to that illustrated in FIG. 5.

The piston 62, which has moved in the forward direction, is maintained in the state wherein it closes the aperture 60 of the feed duct 52. With this state, the injection plunger 28 advances, in the downward direction in the figure, to inject the rubber from within the injection chamber 26 from the nozzle 38 at the tip thereof to inject the rubber into the molding cavity 16 of the mold 10, as shown in FIG. 6. At this time, the pushing assembly 15 works as a reverse flow prevention device for the rubber, preventing the reverse flow of the rubber within the injection chamber 26 into the feed duct 52. The rubber that has been injected into the molding cavity 16 is then heated to the heating temperature, after which vulcanization is performed through maintaining the rubber at the heating temperature for a specific amount of time.

Figure 7:
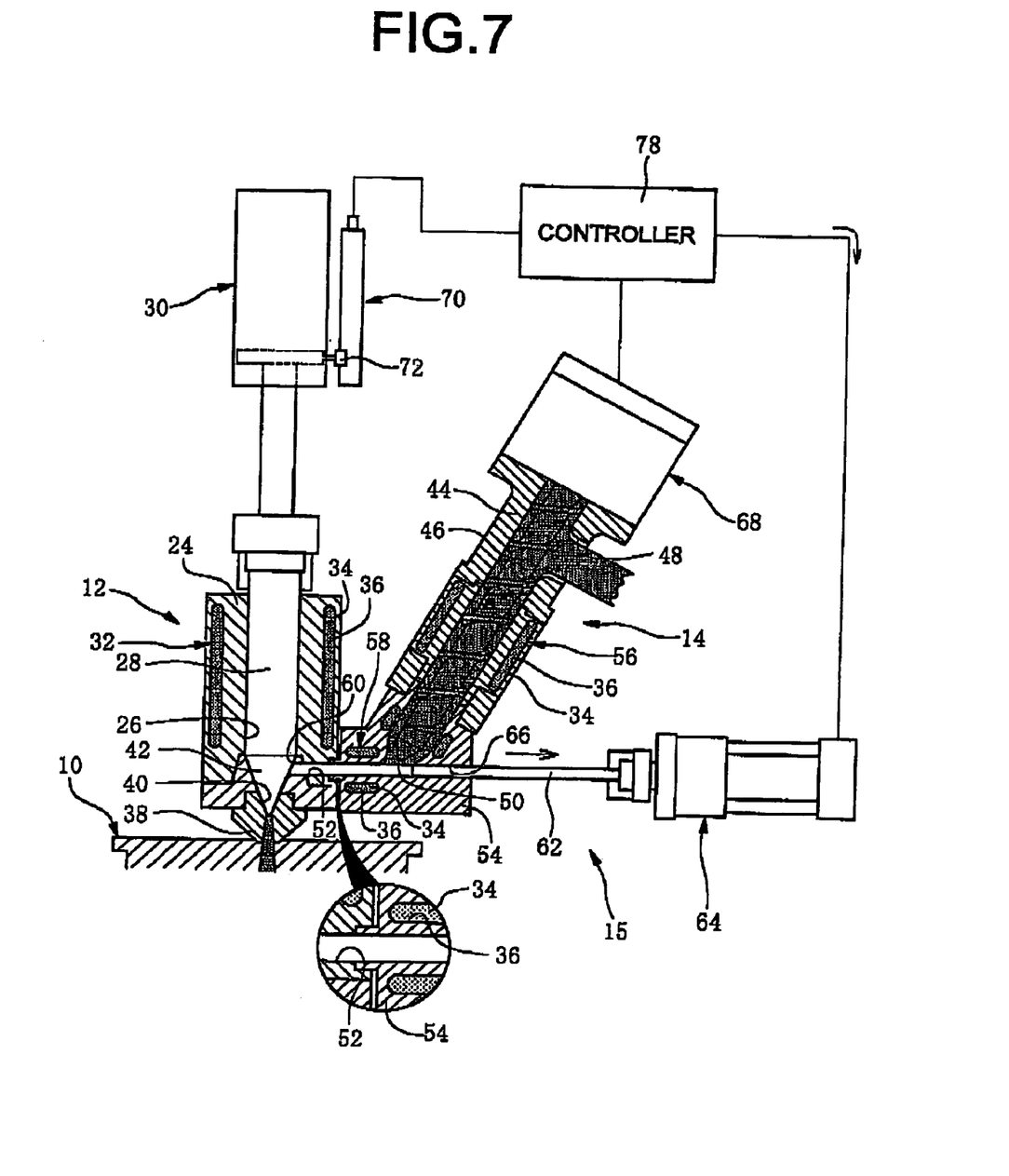
FIG. 7 is a view illustrating yet another operation state successive to that illustrated in FIG. 6.

On the other hand, the aforementioned piston 62, which has been pushed out all the way to the forward direction limit, pulls in (withdraws) to the withdrawal limit, as shown in FIG. 7, after the injection method, and waits in that state until the next push operation.

As described above, given the present embodiment, the occurrence of residual rubber within the feed duct 52 can be prevented, and then by injecting the remaining rubber within the feed duct 52 into the molding cavity 16 in the next injection method, problems with a reduction in temperature of the injected rubber can be eliminated, making it possible to increase the temperature of the rubber, beyond that of the conventional technology, in the stage wherein the rubber is injected into the molding cavity 16. More specifically, the rubber, when injected into the molding cavity 16 can be heated to a temperature of not less than 85%, more preferably 90% of a vulcanization temperature of the rubber in the mold cavity.

This enables a substantial reduction in the time required for the rubber injected into the molding cavity 16 to reach the vulcanization temperature, enabling a major reduction, relative to the conventional technology, in the time required for vulcanization Specifically, the rubber temperature within the injection chamber 26 may be about 120° C., the rubber temperature at the stage wherein the rubber passes through the nozzle 38 may be increased to about 140° C., and the rubber temperature at the point in time wherein the rubber is injected into the molding cavity 16 may be increased to about 160° C. This arrangement makes it possible to reduce dramatically the vulcanization time from the conventional six minutes to 2.5 minutes, as resulting from measurements of vulcanization times, when the vulcanization set temperature for the mold is 170° C. This substantial reduction in vulcanization time enables a substantial increase in manufacturing efficiency for rubber products, enabling a reduction in the number of the required molds 10, and enabling a reduction in the space occupied by the vulcanization equipment.

In the present embodiment, the rubber pushing assembly 15 works as reverse flow prevention member for preventing the reverse flow of rubber into the feed duct 52, thus enabling the elimination of the reverse flow prevention valve 230 used in the conventional rubber injection molding device shown in FIG. 8. Moreover, at the same time, the ability to eliminate the reverse flow prevent valve is also able to solve the problem with the occurrence of residual rubber in the reverse flow prevention valve.

In the present embodiment, the pushing assembly 15 is structured so that the piston 62 is moved forward along the feed duct 52 by a driving device 64, and thus the pushing assembly 15 can be structured with a simple structure, and the rubber within the feed duct 52 can be pushed efficiently into the injection chamber 26.

Moreover, in the present embodiment, the provision of the heating apparatus 58 enables the temperature of the first-feed rubber, from the feed machine 14, to be increased where, actually in a feed machine 14 that is held at 90° C., when, after feeding one shot worth of rubber, that being 250 mm, using intermittent motion, the temperature is measured for each 50 mm worth separately, the results for the conventional product, without the heating apparatus in the feed duct 52 were 76° C., 95° C., 105° C., 106° C., and 106° C., with a maximum deviation in rubber temperature of 30° C., while, in contrast, temperatures of 113° C., 113° C., 114° C., 115° C., and 115° C., for a thermal deviation in the rubber being only a scant 2° C. was achieved in the product the invention that has heating apparatus 58 (with a temperature setting of 120° C.) for the feed duct 52. As can be seen from the results above, the provision of the heating apparatus 58 can reduce the variability of the rubber temperature in the rubber that is injected into the molding cavity 16 and in the injection chamber 26, even given intermittent operation, enabling increased product quality.

Furthermore, the rubber injection molding device according to the present embodiment is arranged such that the withdraw limit of the injection plunger 28 is set taking into account the amount of rubber pushed into the feed duct 52 from the pushing assembly 15 through the feed of the rubber from the feed machine 14. Accordingly, regardless of the forcing of the rubber into the feed duct 52 by the pushing assembly 15, the amount of rubber charged into the injection chamber 26 will be the most appropriate amount for the charge for a single cycle.

According to the present embodiment, furthermore, the structure is such that the entire injection chamber 26 will be filled by the injection plunger 28 when the injection plunger 28 is at the forward limit, thus solving the problem with the occurrence of residual rubber within the injection cylinder 24 after the injection. This arrangement makes it possible to further increase the temperature of the rubber that is injected into the molding cavity 16, enabling a substantial reduction in the time for vulcanization.

While the present invention has been described in detail in its presently preferred embodiment, for illustrative purpose only, it is to be understood that the invention is by no means limited to the details of the illustrated embodiment, but may be otherwise embodied with various changes, modifications and improvements which may occur to those skilled in the art, without departing from the spirit and scope of the invention.

What is claimed is:

1. A rubber injection molding device comprising:

a mold having a molding cavity therein;

an injecting machine including an injection cylinder having an injection chamber for storing a rubber therein, and an injection plunger for injecting the rubber from the injection chamber into the molding cavity by an advancement of the injection plunger;

a feed machine having a feed cylinder with a feed aperture formed at a tip end thereof and connected with the injection chamber through a feed duct, and being adapted to feed into the injection chamber, through the feed duct the rubber in a mixed state, and a pushing assembly which has a piston that pushes into the injection chamber the rubber that remains within the feed duct after a feed operation of the rubber by the feed machine, and the piston directly closes a connecting aperture between the feed duct and the injection chamber at a forward travel limit of the piston.

2. A rubber injection molding device according to claim 1, further comprising:

a reverse flow prevention member for retaining the rubber within the injection chamber and preventing a reverse flow of the rubber into the feed duct from the injection chamber, after the rubber within the feed duct has been pushed into the injection chamber.

3. A rubber injection molding device according to claim 1, wherein the piston has essentially a same cross-sectional shape as the feed duct, where rubber within the feed duct is pushed into the injection chamber through the piston being moved forward along the feed duct by a driving device.

4. A rubber injection molding device according to claim 3, wherein the piston is in a shape of a rod.

5. A rubber injection molding device according to claim 3, wherein the feed duct is equipped in a form of a straight line, and a movement passage is formed in a form of a straight line along with the feed duct for permitting the piston to move forward within the feed duct or to draw backwards within the feed duct.

6. A rubber injection molding device according to claim 1, further comprising a heating apparatus for heating provided at an outer peripheral portion of the feed duct so as to heat the rubber that is fed from the feed machine.

7. A rubber injection molding device comprising:

a mold having a molding cavity therein;

an injecting machine including an injection cylinder having an injection chamber for storing a rubber therein, and an injection plunger for injecting the rubber from the injection chamber into the molding cavity by an advancement of the injection plunger;

a feed machine having a feed cylinder with a feed aperture formed at a tip end thereof and connected with the injection chamber through a feed duct, and being adapted to feed into the injection chamber, through the feed duct the rubber in a mixed state; and a pushing assembly which pushes into the injection chamber the rubber that remains within the feed duct after a feed operation of the rubber by the feed machine, wherein the injection plunger that moves forwards and backwards according to charging of the rubber into the injection chamber by a feed of rubber from the feed machine comprises a detection device for detecting withdrawal to a set withdrawal limit and a control unit for stopping the feed of the rubber by the feed machine based on detection by the detection device, the set withdrawal limit being set so that an amount of rubber charged into the injection chamber added to an amount of remaining rubber pushed in from the feed duct will be a set amount for a single charge.

8. A rubber injection molding device according to claim 1, wherein the injection chamber has a tapered shape at a tip end part extending to a tip end nozzle of the injection cylinder, and the injection plunger has, at a tip end thereof, a tapered shape that is a same shape as the tip end part of the injection chamber so that the tip end part of the injection plunger mates with the tip end part of the injection chamber to fill the tip end part of the injection chamber at a forward limit thereof.

9. A manufacturing method of a rubber product by using an injection molding device comprising a mold having a molding cavity therein; an injecting machine including an injection cylinder having an injection chamber for storing a rubber therein, and an injection plunger for injecting the rubber from the injection chamber into the molding cavity by an advancement of the injection plunger; a feed machine having a feed cylinder with a feed aperture formed at a tip end thereof and connected with the injection chamber through a feed duct, and being adapted to feed into the injection chamber, through the feed duct the rubber in a mixed state; and a pushing assembly which has a piston that pushes into the injection chamber the rubber that remains within the feed duct after a feed operation of the rubber by the feed machine, the method comprising the steps of:

pushing the rubber that remains within the feed duct, into the injection chamber by the piston of the pushing assembly, after a feed action of the rubber by the feed machine;

closing a connecting aperture between the feed duct and the injection chamber directly by the piston of the pushing assembly at a forward travel limit of the piston; and injecting the rubber stored in the injection chamber into the molding cavity by a forward motion of the injection plunger so that the rubber is vulcanization molded within the molding cavity.

10. A manufacturing method of a rubber product according to claim 9, wherein the rubber, when injected into the molding cavity, is heated to a temperature of not less than 85% of a vulcanization temperature of the rubber in the molding cavity.

11. A manufacturing method of a rubber product according to claim 9, wherein the feed duct is heated by a temperature higher than a highest temperature of the rubber fed from the feed machine.

* * * * *